(12) United States Patent
Yoshino

(10) Patent No.: US 11,112,508 B2
(45) Date of Patent: Sep. 7, 2021

(54) POSITIONING METHOD AND POSITIONING TERMINAL

(71) Applicant: PANASONIC INTELLECTUAL PROPERTY MANAGEMENT CO., LTD., Osaka (JP)

(72) Inventor: Kazuyuki Yoshino, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 241 days.

(21) Appl. No.: 16/464,188

(22) PCT Filed: Sep. 15, 2017

(86) PCT No.: PCT/JP2017/033380
§ 371 (c)(1),
(2) Date: May 24, 2019

(87) PCT Pub. No.: WO2018/110011
PCT Pub. Date: Jun. 21, 2018

(65) Prior Publication Data
US 2020/0292714 A1 Sep. 17, 2020

(30) Foreign Application Priority Data

Dec. 16, 2016 (JP) .............................. JP2016-244371

(51) Int. Cl.
*G01S 19/42* (2010.01)
*G01S 19/40* (2010.01)
*G01S 19/52* (2010.01)

(52) U.S. Cl.
CPC .............. *G01S 19/42* (2013.01); *G01S 19/40* (2013.01); *G01S 19/52* (2013.01)

(58) Field of Classification Search
CPC .......... G01S 19/42; G01S 19/40; G01S 19/52; G01S 19/24; G01S 19/1914; G01S 19/32; H01Q 1/1257; G01C 15/00
(Continued)

(56) References Cited

U.S. PATENT DOCUMENTS 7,835,863 B2 * 11/2010 Lokshin ................. G01S 19/48
701/472
9,562,788 B1 * 2/2017 Jinkins ................... G01S 13/953
(Continued)

FOREIGN PATENT DOCUMENTS

JP 10-253732 9/1998
JP 2001264409 A * 9/2001
(Continued)

OTHER PUBLICATIONS

International Search Report issued in International Pat. Appl. No. PCT/JP2017/033380, dated Dec. 12, 2017.

*Primary Examiner* — Harry K Liu
(74) *Attorney, Agent, or Firm* — Greenblum & Bernstein, P.L.C.

(57) ABSTRACT

A processor calibrates the velocity of a moving object by removing a velocity bias from the velocity of the moving object and calculates a DR solution based on the calibrated velocity of the moving object. In a case where a fixed solution is calculated in positioning calculation, the processor outputs the fixed solution as coordinates of the moving object, whereas in a case where a fixed solution is not calculated, the processor outputs the DR solution based on the calibrated velocity of the moving object as the coordinates of the moving object.

15 Claims, 5 Drawing Sheets

(58) Field of Classification Search
USPC .......................................................... 342/352
See application file for complete search history.

(56) References Cited

U.S. PATENT DOCUMENTS

2013/0135145 A1* 5/2013 Iwase ..................... G01S 19/47
342/357.27
2013/0335266 A1* 12/2013 Vollath .................. G01S 19/072
342/357.25

FOREIGN PATENT DOCUMENTS

| JP | 2006-317241 | 11/2006 |
| JP | 2009-270928 | 11/2009 |
| JP | 2010-060421 | 3/2010 |
| JP | 2010-243216 | 10/2010 |

* cited by examiner

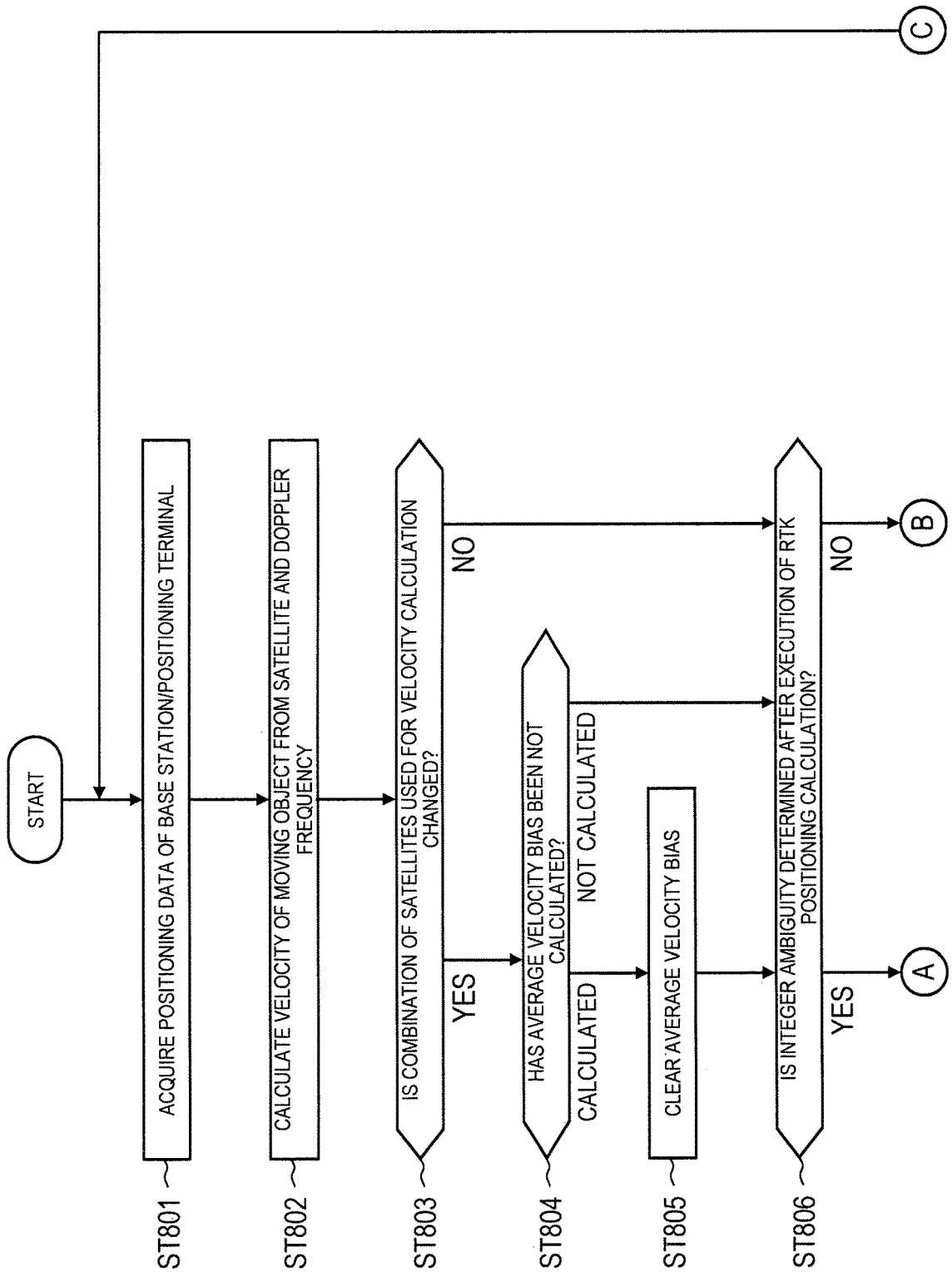

POSITIONING METHOD AND POSITIONING TERMINAL

TECHNICAL FIELD

The present invention relates to a positioning method and a positioning terminal for performing interferometric positioning of a moving object by using a signal from a positioning satellite (hereinafter, artificial satellites that can be used for positioning are collectively referred to as "satellites").

BACKGROUND ART

In the related art, in order to highly accurately measure an object in a stationary state, interferometric positioning by real time kinematic (RTK) method is used. It is expected that high precision positioning of the moving object is realized by applying the interferometric positioning by the RTK method to the positioning of the moving object.

PTL 1 discloses a positioning device capable of realizing highly accurate Doppler positioning by improving measurement accuracy of Doppler frequency in positioning calculation using a signal from a satellite.

CITATION LIST

Patent Literature

PTL 1: Japanese Patent Unexamined Publication No. 10-253732

SUMMARY OF THE INVENTION

Technical Problem

It is studied to perform positioning (estimation of coordinates) of a moving object by dead reckoning navigation using the velocity of the moving object in a case where a low-accuracy positioning solution (float solution) whose ambiguity has not been determined by RTK calculation is calculated.

An embodiment of the present disclosure discloses a positioning method and a positioning terminal capable of suppressing cumulative expansion of positioning errors and realizing highly accurate positioning of a moving object in the case of performing positioning of the moving object by dead reckoning navigation.

Solution to Problem

A positioning method according to an aspect of the present disclosure is a positioning method for determining coordinates of a moving object, by a positioning terminal, by performing a positioning calculation based on information transmitted from a plurality of satellites. The positioning terminal calculates a fixed solution which is a solution obtained by the positioning calculation or a float solution which is a solution obtained by the positioning calculation and has lower accuracy than the fixed solution and calculates a velocity bias based on a movement amount of the fixed solution and a velocity of the moving object. Then, the positioning terminal calibrates a velocity of the moving object by removing the velocity bias from the velocity of the moving object and calculates a dead reckoning (DR) solution which is an estimated value of the coordinates of the moving object based on the calibrated velocity of the moving object. Then, the positioning terminal outputs the DR solution as the coordinates of the moving object in a case where at least the fixed solution is not calculated in the positioning calculation.

A positioning terminal according to an aspect of the present disclosure includes a receiver that receives positioning signals transmitted from a plurality of satellites, and a processor that determines coordinates of a moving object by performing a positioning calculation based on information included in the positioning signals. The processor calculates a fixed solution which is a solution obtained by the positioning calculation or a float solution which is a solution obtained by the positioning calculation and has lower accuracy than the fixed solution. Then, the positioning terminal calculates a velocity bias based on a movement amount of the fixed solution and a velocity of the moving object and calibrates a velocity of the moving object by removing the velocity bias from the velocity of the moving object and calculates a dead reckoning (DR) solution which is an estimated value of the coordinates of the moving object based on the calibrated velocity of the moving object. Then, the positioning terminal outputs the DR solution as the coordinates of the moving object in a case where at least the fixed solution is not calculated in the positioning calculation.

Advantageous Effect of Invention

According to one aspect of the present disclosure, cumulative expansion of positioning errors can be suppressed and high-accuracy positioning of the moving object can be realized in the case of performing positioning of the moving object by dead reckoning navigation.

BRIEF DESCRIPTION OF DRAWINGS

FIG. 7A is a flowchart showing positioning processing according to the embodiment.

DESCRIPTION OF EMBODIMENT

Hereinafter, embodiments of the present disclosure will be described in detail with reference to drawings as appropriate. However, detailed description may be omitted more than necessary. For example, there are cases where a detailed description of well-known matters and redundant description on substantially the same configuration may be omitted. This is for avoiding unnecessary redundancy of the following description and facilitating understanding by those skilled in the art.

The accompanying drawings and the following description are provided to enable those skilled in the art to fully understand the present disclosure and are not intended to limit the claimed subject matters.

<Configuration of Positioning System>

Figure 1:
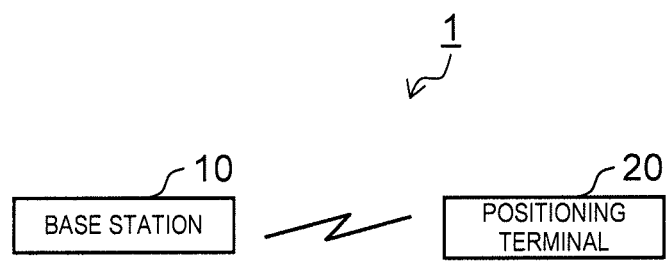
FIG. 1 is a diagram showing a configuration of a positioning system according to an embodiment.

First, the configuration of positioning system 1 according to the present embodiment will be described with reference to FIG. 1. As shown in FIG. 1, positioning system 1 includes base station 10 and positioning terminal 20. Base station 10 is installed at a location where the coordinates on the earth are known. Positioning terminal 20 is installed in a moving object (for example, a vehicle) to which coordinates are to be obtained.

Positioning system 1 measures the position of positioning terminal 20 and obtains the coordinates of positioning terminal 20 on the earth. The coordinates are generally three-dimensional coordinates of latitude, longitude, and altitude, for example, but may be two-dimensional coordinates such as latitude and longitude.

Base station 10 and positioning terminal 20 receive a positioning signal from a global navigation satellite system (GNSS) satellite (not shown). GNSS is a generic term for satellite navigation systems with performance (accuracy and reliability) usable for civil aviation navigation such as global positioning system (GPS), GLONASS, Galileo, and the like. The positioning signal includes a L1 signal (1575.42 MHz), a L2 signal (1227.60 MHz), and the like transmitted from the GPS satellite.

Base station 10 generates positioning data (hereinafter, referred to as "base station positioning data") of base station 10 based on the received positioning signal and transmits the positioning data to positioning terminal 20. Details of the positioning data will be described later.

Positioning terminal 20 generates the positioning data (hereinafter, referred to as "positioning terminal positioning data") of positioning terminal 20 based on the received positioning signal, performs the interferometric positioning processing by the RTK method for each one epoch by using the base station positioning data and the positioning terminal positioning data, and outputs the coordinates of the moving object. The epoch is data acquisition time, and an epoch interval is a time unit representing the time interval (cycle) of the data acquisition time. For example, in a case where positioning terminal 20 operates at 5 Hz, five pieces of data are acquired per second, and therefore the epoch interval is 0.2 seconds. Positioning terminal 20 includes a dedicated terminal for positioning, a personal computer having a positioning function, a smartphone, a tablet, a server that performs a positioning service, and the like.

<Configuration of Base Station>

Figure 2:
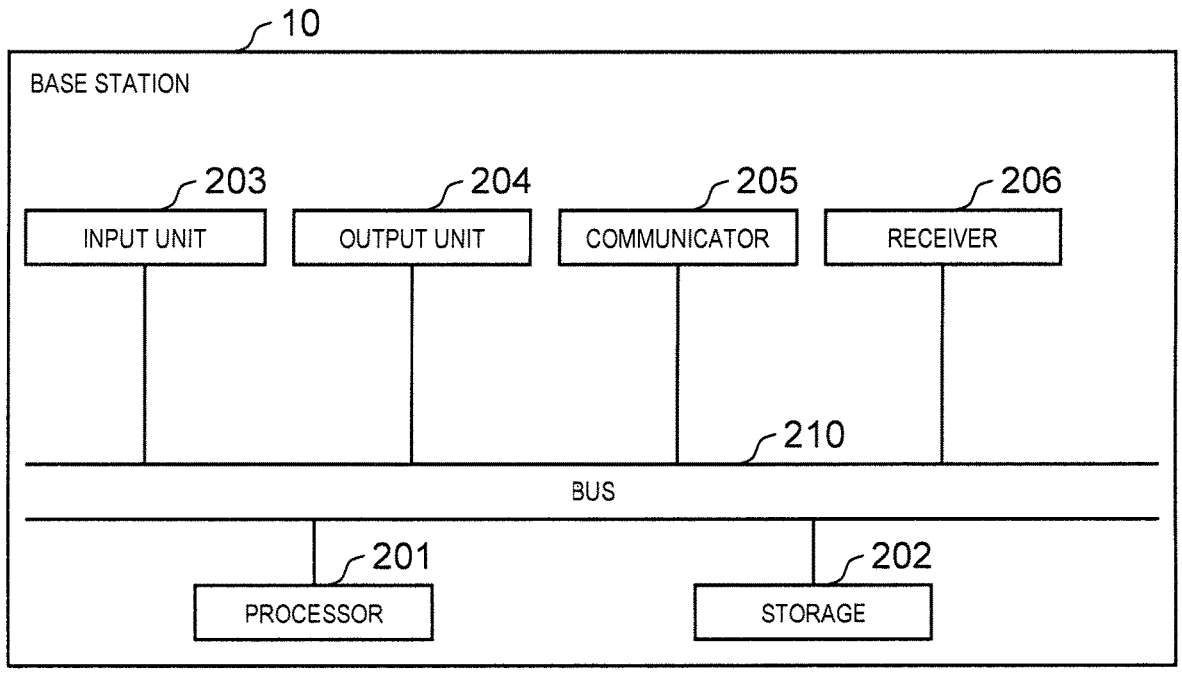
FIG. 2 is a block diagram showing a configuration of a base station according to the embodiment.

Next, the configuration of base station 10 according to the present embodiment will be described with reference to FIG. 2. As shown in FIG. 2, base station 10 includes a processor 201, storage 202, input unit 203, output unit 204, communicator 205, receiver 206, and bus 210.

Processor 201 controls other elements of base station 10 via bus 210. As processor 201, for example, a general-purpose central processing unit (CPU) is used. In addition, processor 201 generates base station positioning data based on the positioning signal by executing a predetermined program.

Storage 202 acquires various pieces of information from other elements and holds the information temporarily or permanently. Storage 202 is a generic name of a so-called primary storage device and secondary storage device. A plurality of storages 202 may be physically disposed. As storage 202, for example, direct random-access memory (DRAM), hard disk drive (HDD), solid-state drive (SSD) are used.

Input unit 203 receives information from the outside. The information received from the outside by input unit 203 includes information on the inputs from an operator of base station 10. As an example, input unit 203 can be configured by using an input interface such as a keyboard.

Output unit 204 presents information to the outside. The information presented by output unit 204 includes information on positioning and the like. As an example, output unit 204 can be configured by using an existing output interface such as a display.

Communicator 205 communicates with an external device via a communication path. A device (communicating target) to communicate with communicator 205 includes positioning terminal 20.

As an example, communicator 205 can be configured by using a communication interface capable of communicating with an existing communication network such as a wireless LAN communication network, 3G communication network or the like.

Receiver 206 receives the positioning signal from the satellite and outputs the positioning signal to processor 201 via bus 210.

The configuration of base station 10 is an example. It is also possible to integrate a part of each constituent element of base station 10. It is also possible to configure by dividing a part of each constituent element of base station 10 into a plurality of elements. A part of respective constituent elements of base station 10 can be omitted. It is also possible to configure by adding other elements to base station 10. In addition, base station 10 of the present disclosure includes a reference station established by a municipality such as a country or the like.

<Configuration of Positioning Terminal>

Figure 3:
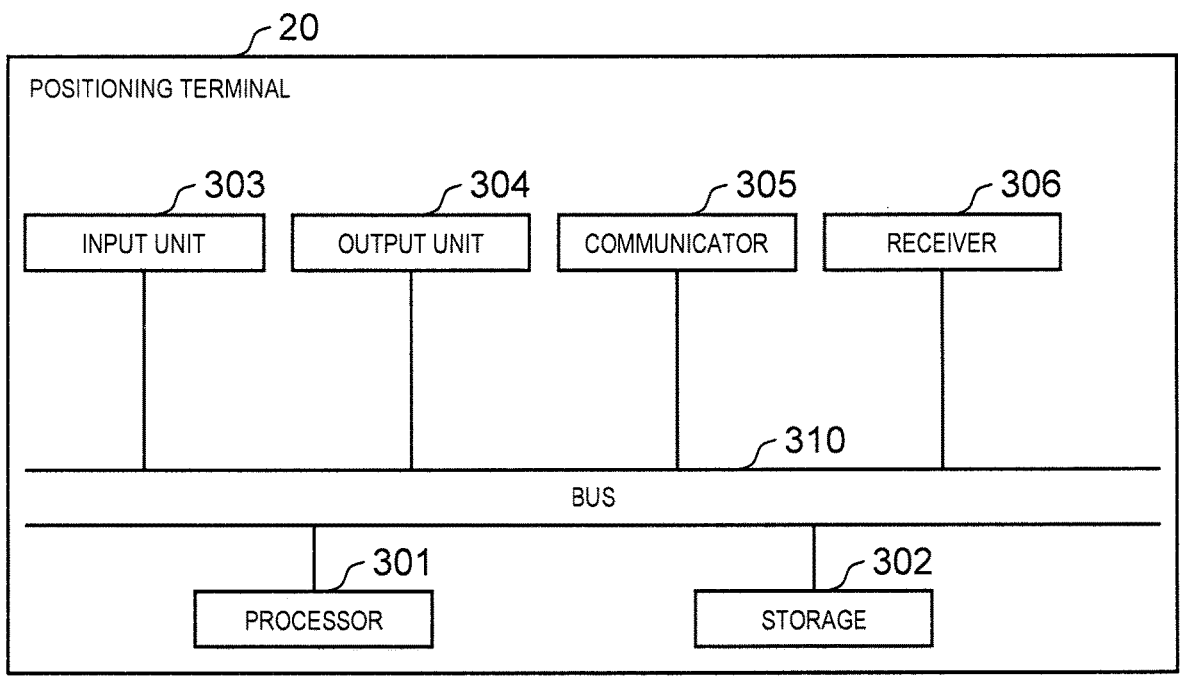
FIG. 3 is a block diagram showing a configuration of a positioning terminal according to the embodiment.

Next, the configuration of positioning terminal 20 according to the present embodiment will be described with reference to FIG. 3. As shown in FIG. 3, positioning terminal 20 includes processor 301, storage 302, input unit 303, output unit 304, communicator 305, receiver 306, and bus 310.

Processor 301 controls other elements of positioning terminal 20 via bus 310. As processor 301, for example, a general-purpose CPU is used. In addition, processor 301 executes a predetermined program to generate positioning terminal positioning data based on the positioning signal. In addition, in the present embodiment, processor 301 has a function of outputting coordinates of a moving object. Details of the function of this processor 301 will be described later.

Storage 302 acquires various pieces of information from other elements and holds the information temporarily or permanently. Storage 302 is a generic name of a so-called primary storage device and secondary storage device. A plurality of storages 302 may be physically disposed. As storage 302, for example, DRAM, HDD or SSD is used.

Input unit 303 receives information from the outside. The information received from the outside by input unit 303 includes information on the inputs from the operator of positioning terminal 20. As an example, input unit 303 can be configured by using an input interface such as a keyboard.

Output unit 304 presents information to the outside. The information presented by output unit 304 includes information on positioning and the like. As an example, output unit 304 can be configured by using an existing output interface such as a display.

Communicator 305 communicates with an external device via a communication path. A device (communicating target) to communicate with communicator 305 includes base station 10. As an example, communicator 305 can be configured by using a communication interface capable of communicating with an existing communication network such as a wireless LAN communication network, 3G communication network or the like.

Receiver 306 receives the positioning signal from the satellite and outputs the positioning signal to processor 301 via bus 310.

The configuration of positioning terminal 20 is an example. It is also possible to configure by integrating a part of each constituent element of positioning terminal 20. It is also possible to configure by dividing a part of each constituent element of positioning terminal 20 into a plurality of elements. A part of each constituent element of positioning terminal 20 can be omitted. It is also possible to configure by adding other elements to positioning terminal 20.

<Moving Object Coordinates Output Function of Processor of Positioning Terminal>

Next, the function of outputting the coordinates of the moving object of processor 301 of positioning terminal 20 will be described in detail.

Based on the base station positioning data and the positioning terminal positioning data, processor 301 executes interferometric positioning by the RTK method for each one epoch to calculate a fixed solution or a float solution.

In addition, in a case where a fixed solution may be obtained, processor 301 measures the time (hereinafter, referred to as "first time") during which a fixed solution is consecutively obtained and determines whether or not a first time has reached predetermined time T1 (for example, 20 seconds). Further, in a case where a fixed solution may not be obtained, processor 301 measures the time (hereinafter, referred to as "second time") since the latest fixed solution was obtained and determines whether or not the second time has reached predetermined time T2 (for example, 60 seconds). Processor 301 may count the number of times of positioning processing (data acquisition) corresponding to a first time and a second time. For example, in a case where the epoch interval is 0.2 seconds, if a fixed solution is obtained 100 times consecutively, the first time has reached predetermined time T1 (=20 seconds), and if a fixed solution may not be obtained 300 consecutive times after obtaining the fixed solution, the second time has reached predetermined time T2 (=60 seconds).

In addition, processor 301 calculates a vector difference between the unit time converted amount (obtained by dividing the displacement around one epoch of the fixed solution by the epoch interval) of the movement amount of the fixed solution by the RTK operation and the velocity of the moving object as a velocity bias. For example, the velocity of the moving object is calculated from the Doppler frequency included in the positioning terminal positioning data, or is output from a velocity detection module (not shown) provided in the moving object. The information on the velocity is information defined as the amount of movement per unit time with respect to a predetermined dimension such as "X meter per second in a south direction, Y meter per second in an east direction, and Z meter per second in a height direction".

Then, in a state in which the first time has reached predetermined time T1, processor 301 calculates the average value (hereinafter, referred to as "average velocity bias") of the velocity bias. In a case where the fixed solution is continuously obtained even after the first time reaches predetermined time T1, processor 301 calculates an average velocity bias at predetermined time T1 whose end is the time at which the latest fixed solution is obtained. In addition, in the time period when the fixed solution may not be obtained, processor 301 holds the average velocity bias until the second time reaches predetermined time T2 and clears (initializes) the average velocity bias after the second time reaches predetermined time T2. Further, in the case of calculating the velocity from the Doppler frequency, processor 301 also clears the average velocity bias in a case where the combination of satellites to be used for velocity calculation is changed. In addition, in a case where a fixed solution is again obtained after clearing the average velocity bias, processor 301 recalculates the velocity bias.

Then, processor 301 adds the inverse vector of the average velocity bias to the velocity of the moving object, thereby removing the velocity bias from the velocity and calibrating the velocity of the moving object.

Then, processor 301 estimates the current coordinates of the moving object based on the previous coordinates of the moving object and the information on the calibrated velocity of the moving object. The previous coordinates of the moving object are, for example, the coordinates output last time (that is, before one epoch). In the present disclosure, the word "the current coordinates of the moving object" is used in the sense of contrasting the previous coordinates of the moving object, but "the current coordinates of the moving object" means the coordinates at which the moving object is assumed to exist after the "previous coordinates of the moving object", "current" in this case does not necessarily mean the time at which a coordinate output device is operating. Processor 301 estimates the current coordinates of the moving object by adding the amount of movement corresponding to one epoch interval obtained from the calibrated velocity of the moving object to the coordinates of the moving object before one epoch. The estimated coordinates are also called dead reckoning coordinates or dead reckoning (DR) solutions.

Then, processor 301 outputs the current coordinates of the moving object to output unit 304 every one epoch. Specifically, processor 301 performs a quality check by using the ambiguity ratio (AR) value obtained by the RTK operation, and outputs a fixed solution in a case where the AR value is equal to or greater than a predetermined threshold value (for example, 3.0), outputs a DR solution until the second time (time since the latest fixed solution was obtained) reaches predetermined time T2 in a case where the AR value is less than the predetermined threshold value (for example, 3.0), and outputs a float solution after the second time has reached predetermined time T2.

<Positioning Data>

Next, the positioning data will be described. In the present embodiment, the positioning data includes pseudo-distance information, carrier phase information, and Doppler frequency information.

Pseudo-distance information is information on the distance between the satellite and the own station thereof (base station 10 or positioning terminal 20). The processor (processor 201 or processor 301) can calculate the distance between the satellite and the own station thereof by analyzing the positioning signal. Specifically, the processor first obtains the arrival time of the positioning signal based on two pieces of information (1) the difference between the pattern of the code carried by the positioning signal and the pattern of the code generated by the own station and (2) the signal-generated time of the satellite included in the message (NAVDATA) included in the positioning signal and the signal-received time of the own station. Then, the processor obtains the pseudo distance between the satellite and the own station thereof by multiplying the arrival time by the velocity of light. This distance includes an error caused by a difference between the clock of the satellite and the clock of the own station and the like. Normally, pseudo-distance information is generated for four or more satellites to reduce this error.

The carrier phase information is the phase of the positioning signal received by the own station thereof. The positioning signal is a predetermined sinusoidal wave. The processor can calculate the phase of the positioning signal by analyzing the received positioning signal.

The Doppler frequency information is information on the relative velocity between the satellite and the own station thereof. The processor can generate Doppler frequency information by analyzing the positioning signal.

As described above, the positioning data is generated by processor 201 of base station 10 and processor 301 of positioning terminal 20, respectively.

<RTK Calculation>

RTK calculation will be described. The RTK calculation is an operation that executes the RTK method which is one of interferometric positioning methods.

The RTK method is to perform positioning at a predetermined point by using the carrier phase integrated value of the positioning signal transmitted by the satellite. The carrier phase integrated value is the sum of (1) the number of waves of the positioning signal from the satellite to a predetermined point and (2) the phase. Since the frequency (and wavelength) of the positioning signal is known if the carrier phase integrated value is obtained, the distance from the satellite to the predetermined point can be obtained. The number of waves of the positioning signal is called an integer ambiguity or an integer value bias since the number of waves is an unknown number.

What is important in executing the RTK method is removal of noise and estimation (determination) of integer ambiguity.

In the RTK method, noise can be removed by calculating a difference called double difference. The double difference is the difference between single differences of two receivers (in the present embodiment, base station 10 and positioning terminal 20), each of the single difference being the difference between carrier phase integrated values of each receiver with respect to two satellites. In the present embodiment, four or more satellites are used for positioning using the RTK method. Therefore, the double difference is calculated by the combination of four or more satellites. In this calculation, base station positioning data and positioning terminal positioning data are used.

In the RTK method, estimation of integer ambiguity can be performed in various ways. For example, estimation of integer ambiguity can be performed by executing the procedure of (1) estimation of a float solution by a least squares method and (2) verification of a fixed solution based on a float solution.

Estimation of a float solution by the least squares method is executed by preparing simultaneous equations by using a combination of double differences generated for each time unit and solving the prepared simultaneous equations by the least squares method. The simultaneous equations are generated for each epoch. In this calculation, the base station positioning data, the positioning terminal positioning data, and the known coordinates of base station 10 are used. The real number estimate of the integer ambiguity obtained in this way is called a float solution.

The float solution obtained in this way is a real number, whereas the true value of integer ambiguity is an integer. Therefore, it is necessary to work to round the float solution to an integer value. However, there are a plurality of candidates for combinations in rounding the float solution. Therefore, it is necessary to verify the correct integer value from the candidates. A solution that is considered to be somewhat more reliable as an integer bias by the test is called a fixed solution. In the present embodiment, the quality check is performed by using the AR value obtained by the RTK calculation, and the correct integer value is verified based on the result of the quality check. In order to narrow down of the candidates of integer values more efficiently, the base station positioning data is used.

<Calibration Method of Velocity of Moving Object>

Figure 4:
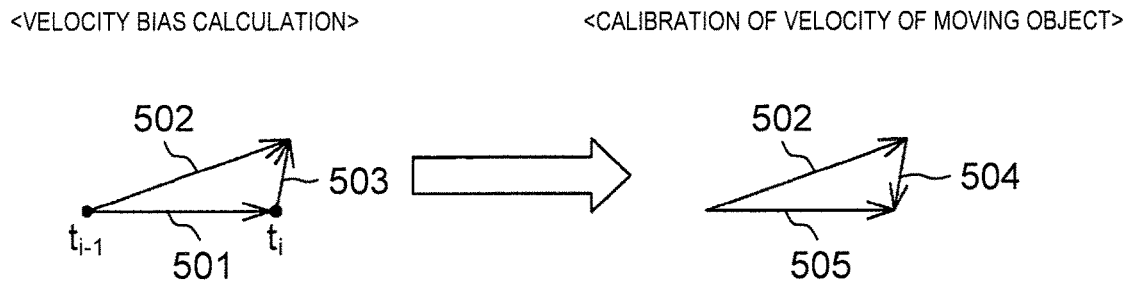
FIG. 4 is a diagram for explaining a method of calibrating a velocity of a moving object according to an embodiment.

Next, a method of calibrating the velocity of the moving object according to the present embodiment will be described with reference to FIG. 4.

Positioning terminal 20 calculates vector difference 503 between unit time converted amount 501 of the movement amount of the fixed solution by the RTK operation and velocity 502 of the moving object as velocity bias Vb. Unit time converted amount 501 of movement amount of the fixed solution is a vector quantity obtained by dividing the difference between a current fixed solution (the coordinates of the moving object at time ti) and a previous (1 epoch before) fixed solution (the coordinates of the moving object at time ti−1) by the epoch interval.

Positioning terminal 20 calculates the average value of velocity bias Vb at predetermined time T1 when the fixed solution is consecutively obtained.

Positioning terminal 20 calibrates velocity 502 of the moving object by adding inverse vector 504 of the average value of velocity bias Vb to velocity 502 of the moving object.

By this calibration, velocity bias Vb is removed from velocity 502 of the moving object, and calibrated velocity 505 is obtained.

<Example of Coordinate Output>

Figure 5:
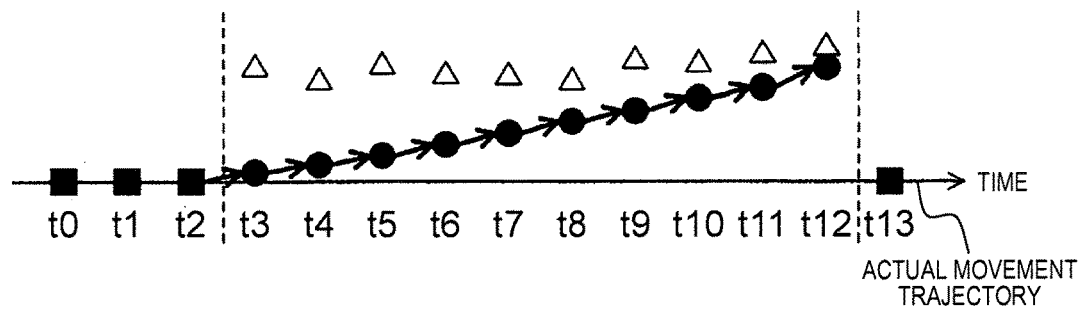
FIG. 5 is a diagram showing an example of coordinates output without calibrating the velocity of the moving object.
Figure 6:
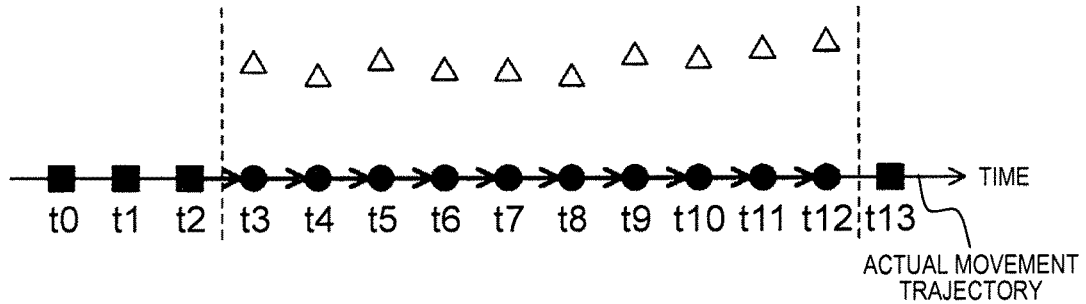
FIG. 6 is a diagram showing an example of coordinates output of the positioning terminal according to the embodiment.

Next, an example of the coordinate output (FIG. 6) of positioning terminal 20 according to the present embodiment will be described in comparison with the case where the velocity of the moving object is not calibrated (FIG. 5). In FIGS. 5 and 6, the fixed solution is indicated by a square, the float solution by a triangle, and the DR solution by a circle. In addition, the solution to be output is shown in black, and the solution which is not output is shown in white.

FIGS. 5 and 6, in the RTK calculation, a fixed solution is obtained from time t0 to t2, a fixed solution may not be obtained from time t3 to t12, and a fixed solution is obtained again at time t13.

If the interferometric positioning by the RTK calculation is simply applied to the positioning of the moving object and the float solution in the time period (time t3 to t12) in which the fixed solution may not be obtained is output, a large positioning error (skipping) of several tens of centimeters to several meters is generated with respect to the actual movement trajectory.

In order to improve this, positioning terminal 20 outputs the DR solution as the current coordinates of the moving object in a time period in which the fixed solution may not be obtained. However, if velocity bias is not removed from the velocity of the moving object, as shown in FIG. 5, the positioning error cumulatively expands, and the difference of the DR solution with respect to the actual movement trajectory expands with the lapse of time.

Therefore, in the present embodiment, positioning terminal 20 calibrates the velocity of the moving object so that the velocity bias is removed, calculates the DR solution based on the calibrated velocity, and outputs the DR solution based on the calibrated velocity as the current coordinates of the moving object at least in a time period in which the fixed solution may not be obtained. As a result, the cumulative expansion of the positioning error is suppressed, and therefore the difference in the DR solution with respect to the actual movement trajectory does not expand even with the lapse of time, as shown in FIG. 6.

In the present embodiment, in the case of calculating the velocity of the moving object from the Doppler frequency with the satellite, positioning terminal 20 may output the float solution without outputting the DR solution when the combination of satellites to be used for velocity calculation is changed.

<Flow of Positioning Processing>

Figure 7B:
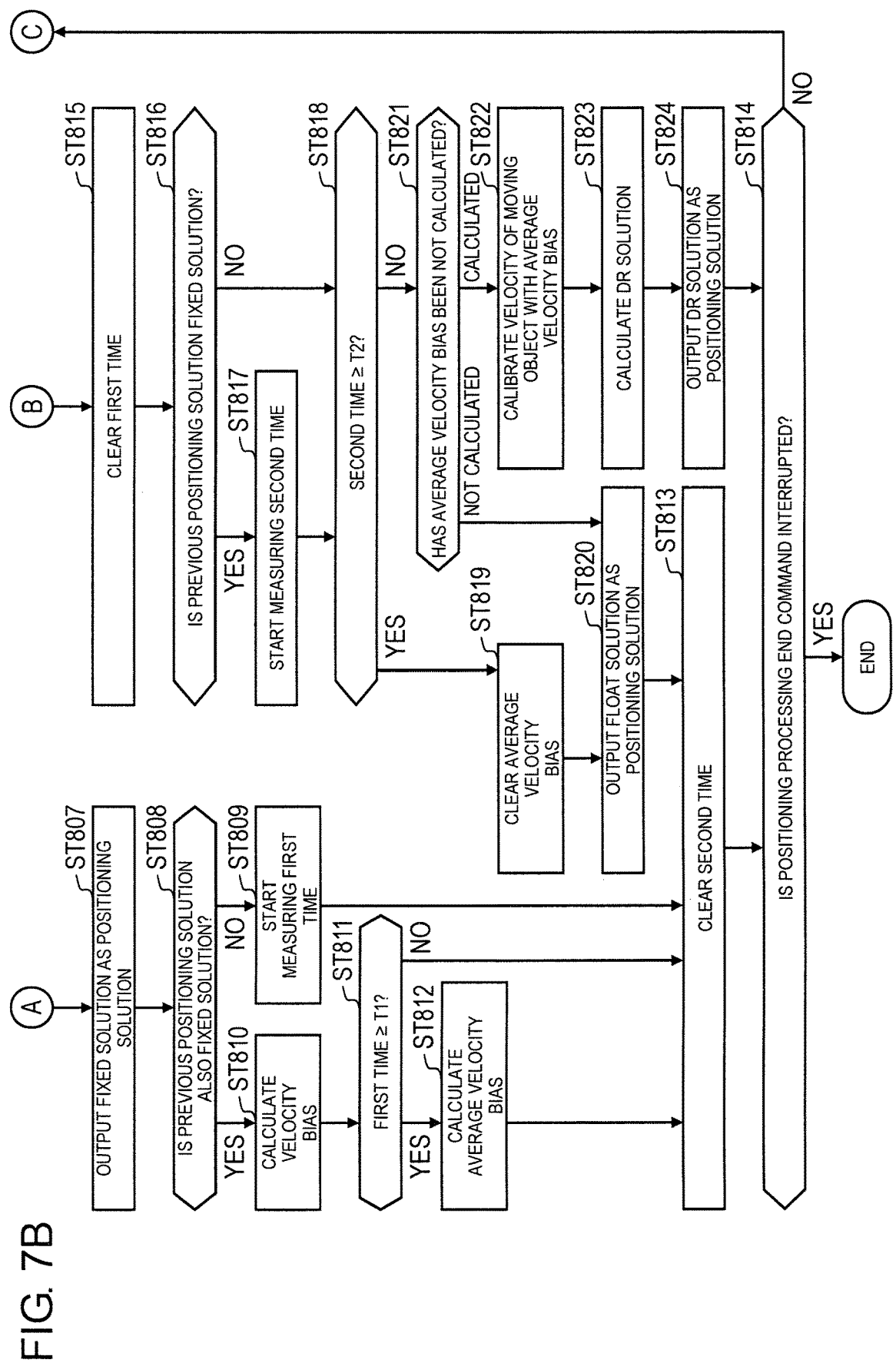
FIG. 7B is a flowchart showing positioning processing according to an embodiment.

Next, the flow of the positioning process according to the present embodiment will be described with reference to FIGS. 7A and 7B. In the present embodiment, an example in which positioning terminal 20 performs positioning processing will be described. However, the positioning processing according to the present disclosure is not limited to being performed by positioning terminal 20 and may be executed by a general-purpose computer added inside positioning system 1, for example. The timing of starting positioning processing is not particularly limited. For example, the positioning processing may be started when the power of positioning terminal 20 is turned on. In addition, the positioning processing may be started when a command to start the positioning processing is input by input unit 303 of positioning terminal 20.

First, in ST801, processor 301 acquires the positioning data of base station 10 and positioning terminal 20. Processor 301 acquires the base station positioning data via communicator 305 and stores the base station positioning data in storage 302. The base station positioning data is generated by processor 201 of base station 10. In addition, processor 301 generates positioning terminal positioning data based on the positioning signal received by receiver 306 and stores the positioning terminal positioning data in storage 302.

Next, in ST802, processor 301 calculates the velocity of the moving object from the Doppler frequency with the satellite. At this time, in a case where the combination of satellites to be used for velocity calculation is changed (ST803: YES), in ST804, processor 301 determines whether or not the average velocity bias has been calculated. When the combination of satellites has not been changed (ST803: NO), the flow proceeds to ST806. In the present disclosure, the "velocity" to be subjected to bias removal is not limited to the velocity calculated from the Doppler frequency, but also includes the velocity output from other measurement devices.

In a case where the average velocity bias has already been calculated (ST804: CALCULATED), processor 301 clears the average velocity bias in ST805. Thereafter, the flow proceeds to ST806. Also in a case where the average velocity bias has not been calculated (ST804: NOT CALCULATED), the flow proceeds to ST806.

In ST806, processor 301 executes the RTK operation processing and calculates a fixed solution or a float solution. Further, in ST806, processor 301 determines whether or not the integer ambiguity of the carrier phase is determined, that is, whether or not the fixed solution is obtained. In the present embodiment, it is assumed that ambiguity is determined (fixed solution is calculated) when the AR value of the solution obtained by the RTK calculation is, for example, 3.0 or more.

In a case where the integer ambiguity is determined in ST806, that is, in a case where a fixed solution is obtained as the current coordinates of the moving object (ST806: YES), in ST807, processor 301 outputs the fixed solution as a positioning solution (the current coordinates of the moving object).

Then, in a case where the previous positioning solution is not a fixed solution (ST808: NO), processor 301 starts measuring the first time in ST809. Thereafter, the flow proceeds to ST813.

On the other hand, in a case where the previous positioning solution is also a fixed solution (ST808: YES), in ST810, processor 301 calculates a velocity bias which is a vector difference between the unit time converted amount of the movement amount of the fixed solution and the velocity of the moving object.

Then, in a case where the first time has reached predetermined time T1 (ST811: YES), processor 301 calculates the average velocity bias in ST812. Even in a case where the average velocity bias has already been calculated, processor 301 calculates the average velocity bias again at predetermined time T2 whose end is the time at which the latest fixed solution was output. Thereafter, the flow proceeds to ST813.

In addition, in a case where the first time has not reached predetermined time T1 (ST811: NO), the flow proceeds to ST813.

In ST813, processor 301 clears the second time (consecutive selection time of the DR solution) (sets the second time to "0"). Then, in ST814, processor 301 determines whether or not the positioning processing end command has been interrupted. In a case where the positioning processing end command is not interrupted (ST814: NO), the flow returns to ST801. On the other hand, in a case where the positioning processing end command has been interrupted, the positioning processing is ended.

In addition, in a case where the integer ambiguity is not determined in ST806, that is, in a case where the fixed solution is not obtained as the current coordinates of the moving object (ST806: NO), processor 301 clears the first time in ST815 (sets the first time to "0").

Then, in a case where the previous positioning solution is a fixed solution (ST816: YES), processor 301 starts measuring the second time in ST817. Thereafter, the flow proceeds to ST818. In addition, in a case where the previous positioning solution is not a fixed solution (ST816: NO), the flow proceeds to ST818.

In ST818, processor 301 determines whether or not the second time has reached predetermined time T2.

In a case where the second time has reached predetermined time T2 (ST818: YES), in ST819, processor 301 clears the average velocity bias and outputs the float solution as a positioning solution (the current coordinates of the moving object) in ST820. Thereafter, the flow proceeds to ST813.

On the other hand, in a case where the second time has not reached predetermined time T2 (ST818: NO), in ST821, processor 301 determines whether or not the average velocity bias has been calculated.

In a case where the average velocity bias has not been calculated (ST821: NOT CALCULATED), processor 301 outputs the float solution as the positioning solution (the current coordinates of the moving object) in ST820. Thereafter, the flow proceeds to ST813.

On the other hand, in a case where the average velocity bias has already been calculated (ST821: CALCULATED), in ST822, processor 301 calibrates the velocity of the moving object by using the average velocity bias.

Then, in ST823, processor 301 calculates the DR solution based on the previous positioning solution and the calibrated velocity of the moving object.

Then, in ST824, processor 301 outputs the DR solution as the positioning solution (the current coordinates of the moving object). Thereafter, the flow proceeds to ST814.

In the case of calculating (or acquiring) the velocity of the moving object by another method without calculating the velocity of the moving object from the Doppler frequency with the satellite, the above-described steps from ST802 to ST805 are omitted.

<Effect>

As described above, in the present embodiment, since it is possible to obtain a velocity bias from a difference vector between the movement amount of the fixed solution and the velocity of the moving object in a time period in which the fixed solution is obtained in the RTK calculation to calibrate the velocity of the moving object so that the velocity bias is removed, it is possible to suppress the error of the velocity bias in the velocity of the moving object.

Thus, in a time period in which no fixed solution may be obtained in the RTK operation, cumulative expansion of positioning errors may be suppressed and high-accuracy positioning of the moving object can be realized in the case of performing positioning of the moving object by dead reckoning navigation.

In addition, in the present embodiment, a vector difference between the unit time converted amount of the movement amount of the fixed solution and the velocity of the moving object is calculated as a velocity bias and the inverse vector of the velocity bias is added to the velocity of the moving object to calibrate the velocity of the moving object. As a result, the velocity of the moving object can be calibrated with high accuracy with a small amount of calculation.

In addition, in the present embodiment, the average value of the velocity bias is calculated and the velocity of the moving object is calibrated by adding the inverse vector of the average value of the velocity bias to the velocity of the moving object. Thereby, it is possible to alleviate the fluctuation of the velocity bias and calibrate the velocity of the moving object with high accuracy.

In addition, in the present embodiment, the average value of the velocity bias is calculated at the first time whose end is the time at which the latest fixed solution is obtained. As a result, since the target section of the average value calculation processing can always be kept up to date, the accuracy of the average velocity bias can be kept high.

In addition, in the present embodiment, in a case where the velocity of the moving object is calculated based on the Doppler frequency with the satellite, when the combination of satellites used for velocity calculation is changed, the average value of the velocity bias is cleared. As a result, it is possible to prevent degradation of the accuracy of the average velocity bias due to the change of the combination of the satellites.

In addition, in the present embodiment, in a case where the time during which the fixed solution is not calculated has reached the second time, the float solution is output as the coordinates of the moving object. As a result, it is possible to prevent degradation of the positioning accuracy due to outputting the DR solution for a long time.

In the present disclosure, the type, the placement, the number, and the like of the members are not limited to the above-described embodiments, and the constituent elements thereof can be appropriately replaced with ones having the same operation and effect and can be appropriately changed without departing from the gist of the invention.

For example, in the above embodiment, the velocity of the moving object may be calibrated simply by adding the inverse vector of the velocity bias to the velocity of the moving object without calculating the average value of the velocity bias.

In addition, in the above embodiment, if the velocity bias is an outlier beyond a predetermined range, the velocity bias may be excluded in the calculation of the average velocity bias. As a result, abnormal values can be removed, and therefore the accuracy of average velocity bias can be kept high.

In addition, in the above embodiment, the case where a fixed solution is output as the coordinates of the moving object in a case where the fixed solution is calculated and a DR solution is output as the coordinates of the moving object in a case where a fixed solution is not calculated is described. But, in the present invention, in a case where at least a fixed solution is not calculated, a DR solution may be output as the coordinates of the moving object. And, even in a case where a fixed solution is calculated, a DR solution may be output as the coordinates of the moving object.

In addition, in the above embodiment, the case of performing the RTK calculation as an example of the positioning calculation has been described, but the present disclosure is not limited thereto and a positioning calculation other than the RTK calculation may be performed.

INDUSTRIAL APPLICABILITY

The present disclosure is suitable for use in a positioning method and a positioning terminal that performs interferometric positioning by using a signal from a satellite.

REFERENCE MARKS IN THE DRAWINGS

1 POSITIONING SYSTEM
10 BASE STATION
20 POSITIONING TERMINAL
201 PROCESSOR
202 STORAGE
203 INPUT UNIT
204 OUTPUT UNIT
205 COMMUNICATOR
206 RECEIVER
210 BUS
301 PROCESSOR
302 STORAGE
303 INPUT UNIT
304 OUTPUT UNIT
305 COMMUNICATOR
306 RECEIVER
310 BUS

The invention claimed is:

1. A positioning method for determining coordinates of a moving object, by a positioning terminal, by performing a positioning calculation based on information transmitted from a plurality of satellites,
wherein the positioning terminal
calculates a fixed solution which is a solution obtained by the positioning calculation or a float solution which is a solution obtained by the positioning calculation and has lower accuracy than the fixed solution,
calculates a velocity bias based on a movement amount of the fixed solution, calculates a velocity of the moving object,
calibrates a velocity of the moving object by removing the velocity bias from the velocity of the moving object,
calculates a dead reckoning (DR) solution which is an estimated value of the coordinates of the moving object based on the calibrated velocity of the moving object,
outputs the DR solution as the coordinates of the moving object in a case where at least the fixed solution is not calculated in the positioning calculation, and
outputs the fixed solution as the coordinates of the moving object in a case where the fixed solution is calculated in the positioning calculation.

2. The positioning method of claim 1,
wherein a vector difference between a unit time converted amount of a movement amount of the fixed solution and the velocity of the moving object is calculated as the velocity bias, and
the velocity of the moving object is calibrated by adding an inverse vector of the velocity bias to the velocity of the moving object.

3. The positioning method of claim 2,
wherein an average value of the velocity bias is calculated, and
the velocity of the moving object is calibrated by adding the inverse vector of the average value of the velocity bias to the velocity of the moving object.

4. The positioning method of claim 3,
wherein an average value of the velocity bias is calculated at a predetermined time whose end is the time at which the latest fixed solution is obtained.

5. The positioning method of claim 3,
wherein, if the velocity bias is an outlier beyond a predetermined range, the velocity bias is excluded from the calculation of the average value of the velocity bias.

6. The positioning method of claim 3,
wherein the average value of the velocity bias is cleared when a combination of satellites used for velocity calculation is changed in a case where the velocity of the moving object is calculated based on Doppler frequency with the satellite.

7. The positioning method of claim 1,
wherein the float solution is output as the coordinates of the moving object in a case where the time during which the fixed solution is not calculated reaches a predetermined time.

8. The positioning method of claim 1,
wherein both of the fixed solution and the float solution are obtained from an interferometric positioning processing.

9. A positioning terminal comprising:
a receiver that receives positioning signals transmitted from a plurality of satellites; and
a processor that determines coordinates of a moving object by performing a positioning calculation based on information included in the positioning signals,
wherein the processor
calculates a fixed solution which is a solution obtained by the positioning calculation or a float solution which is a solution obtained by the positioning calculation and has lower accuracy than the fixed solution,
calculates a velocity bias based on a movement amount of the fixed solution,
calculates a velocity of the moving object,
calibrates a velocity of the moving object by removing the velocity bias from the velocity of the moving object,
calculates a dead reckoning (DR) solution which is an estimated value of the coordinates of the moving object based on the calibrated velocity of the moving object,
outputs the DR solution as the coordinates of the moving object in a case where at least the fixed solution is not calculated in the positioning calculation, and
outputs the fixed solution as the coordinates of the moving object in a case where the fixed solution is calculated in the positioning calculation.

10. The positioning terminal of claim 9,
wherein the processor
calculates a vector difference between a unit time converted amount of a movement amount of the fixed solution and the velocity of the moving object as the velocity bias, and
calibrates the velocity of the moving object by adding an inverse vector of the velocity bias to the velocity of the moving object.

11. The positioning terminal of claim 10,
wherein the processor
calculates an average value of the velocity bias, and
calibrates the velocity of the moving object by adding an inverse vector of the average value of the velocity bias to the velocity of the moving object.

12. The positioning terminal of claim 11,
wherein the processor calculates an average value of the velocity bias at a predetermined time whose end is the time at which the latest fixed solution is obtained.

13. The positioning terminal of claim 11,
wherein the processor excludes the velocity bias from the calculation of the average value of the velocity bias if the velocity bias is an outlier beyond a predetermined range.

14. The positioning terminal of claim 11,
wherein the processor clears the average value of the velocity bias when a combination of satellites used for velocity calculation is changed in a case where the velocity of the moving object is calculated based on Doppler frequency with the satellite.

15. The positioning terminal of claim 9,
wherein the processor outputs the float solution as the coordinates of the moving object in a case where the time during which the fixed solution is not calculated reaches a predetermined time.

* * * * *